Dec. 11, 1923.

A. C. McCLOSKEY 1,477,275

COMBINED BUMPER AND FENDER FOR MOTOR VEHICLES

Filed Aug. 27, 1923    3 Sheets-Sheet 1

INVENTOR:
Alfred C. McCloskey.
BY
Niedershein Fairbanks.
ATTORNEYS.

Dec. 11, 1923.
A. C. McCLOSKEY
1,477,275
COMBINED BUMPER AND FENDER FOR MOTOR VEHICLES
Filed Aug. 27, 1923  3 Sheets-Sheet 2
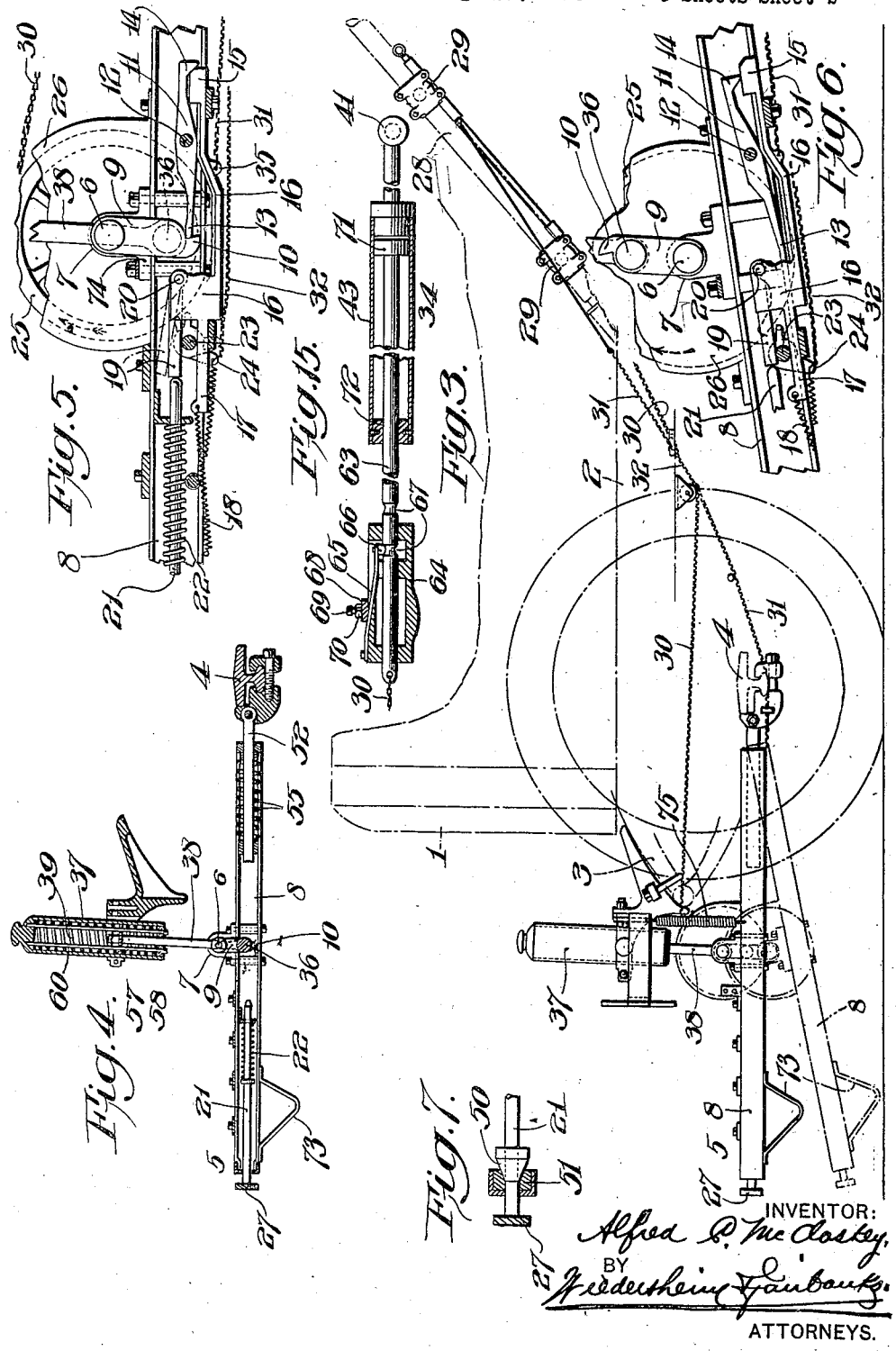
INVENTOR:
Alfred C. McCloskey,
BY
ATTORNEYS.

Dec. 11, 1923.
A. C. McCLOSKEY
1,477,275
COMBINED BUMPER AND FENDER FOR MOTOR VEHICLES
Filed Aug. 27, 1923    3 Sheets-Sheet 3
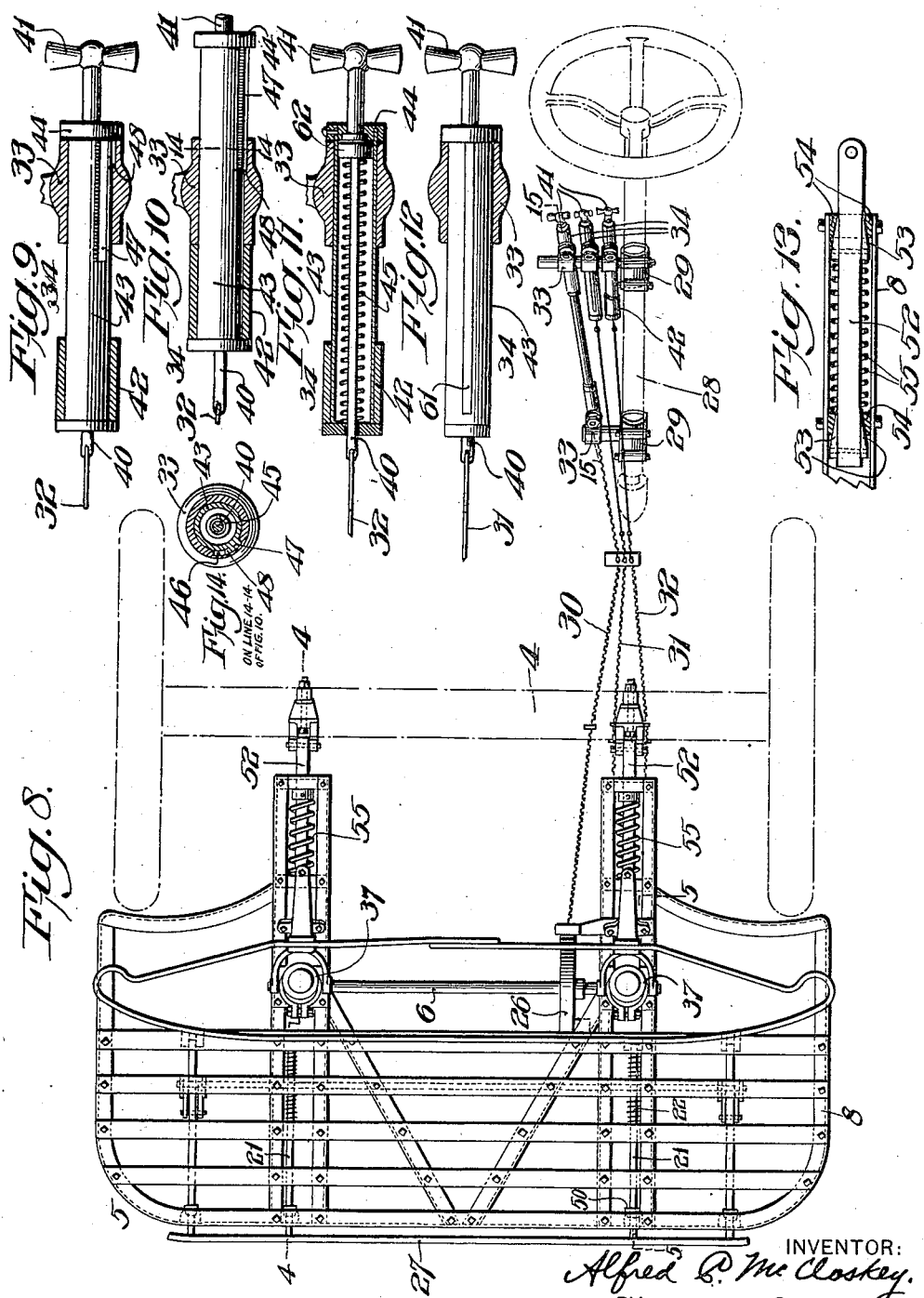
INVENTOR:
Alfred C. McCloskey.
BY
Wiedersheim Fairbanks.
ATTORNEYS.

Patented Dec. 11, 1923.

1,477,275

UNITED STATES PATENT OFFICE.

ALFRED C. McCLOSKEY, OF PHILADELPHIA, PENNSYLVANIA, ASSIGNOR TO FREDERIC W. BACON, OF PHILADELPHIA, PENNSYLVANIA.

COMBINED BUMPER AND FENDER FOR MOTOR VEHICLES.

Application filed August 27, 1923. Serial No. 659,479.

*To all whom it may concern:*

Be it known that I, ALFRED C. McCLOSKEY, a citizen of the United States, residing in the city and county of Philadelphia, State of Pennsylvania, have invented a new and useful Combined Bumper and Fender for Motor Vehicles, of which the following is a specification.

My present invention relates to the general class of car bumpers and fenders, and embodies certain novel improvements upon a combined bumper and fender which forms the subject-matter of an application for patent filed by me August 15, 1922, as Serial Number 581,950, and now pending.

In the invention of my foregoing application, means are provided for raising and lowering the bumper and fender by the foot of the driver.

My present invention comprehends the general construction of a bumper and fender and a means for attaching them to an automobile or other motor vehicle, and to such an extent embodies the general features of the construction of the devices of my pending application that reference is to be made to it for a better understanding of my present improvements, the important features of which are the devices for operating the fender by the hand of the driver.

Broadly stated, my present invention comprehends manually-operated means for lifting and dropping the fender, special novel means for so doing and also for maintaining the fender in its raised position and for releasing it to be dropped,—all of which are described in the following specifications and set forth in the claims.

For the purpose of illustrating my invention, I have shown in the accompanying drawings a certain type and embodiment of it which is at present preferred by me because in practice it has given satisfactory and reliable results.

It is to be understood, however, that the various instrumentalities in which my invention is shown as embodied can be variously arranged and organized, and that my invention is not, therefore, limited to the precise arrangement and organization of these instrumentalities as herein shown and described.

In the drawings, Figure 1 represents a perspective view of the front part of an automobile to which is attached my novel bumper and fender, illustrated in its normal or raised position.

Figure 3 represents a side elevation or view of a part of my invention indicating the fender in full lines in its elevated position, and in dotted lines as dropped.

Figure 4 represents a central, vertical, side sectional detail through the fender and certain of its adjuncts.

Figure 5 represents a view similar to Figure 4, disclosing, however, the detailed construction of the crank, the crank dog, the tripping mechanism, and their adjuncts which my invention embraces, the parts being illustrated in the positions which they occupy when the fender is elevated.

Figure 6 represents a view similar to Figure 5 with the parts in the position which they occupy when the fender is in its lowered position, with the locking device unlatched and the trip rod held in its extreme inward position.

Figure 7 represents a detail of an anti-rattling device which I use in connection with the trip rod.

Figure 8 represents a plan of my fender and of the manually operated handles which I use to effect its control.

Figure 1:
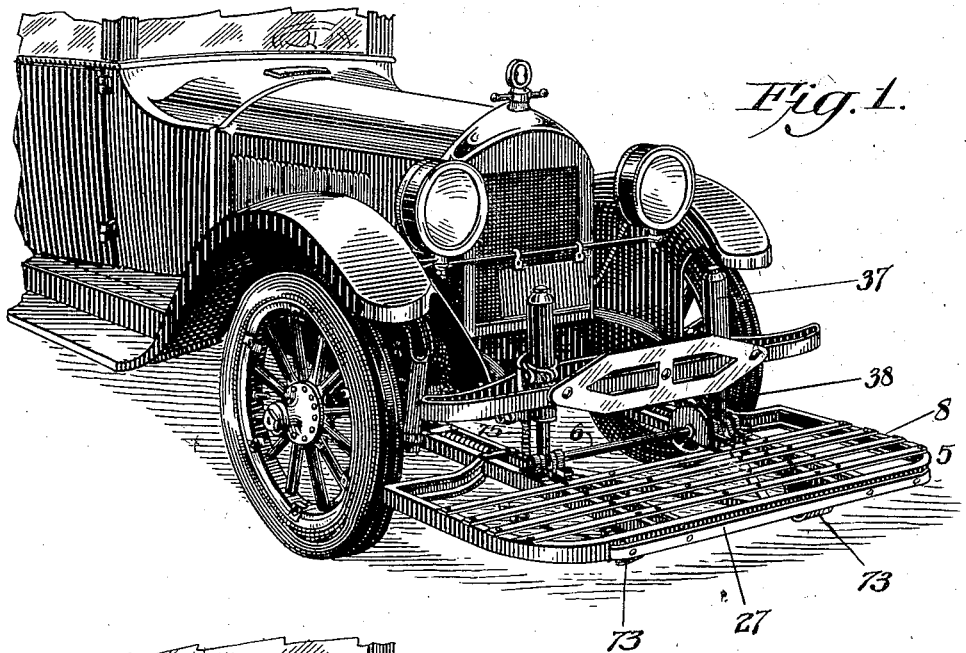

Figures 9, 10, 11, and 12 illustrate in detail and in positions hereinafter explained the manually operated handles which I employ. Figure 13 represents a section of an anti-rattling device.

Figure 14 is a cross section on 14—14 of Figure 10.

Figure 15 represents a section on line 15—15 of Fig. 8.

Similar numerals of reference indicate corresponding parts.

In the drawings, 1 designates a motor vehicle of any desired or conventional type, which is provided in the usual manner with a chassis 2, to which are shown as connected the front springs 3 which carry the front axle 4.

5 designates a fender of the character described and claimed in my pending application, to which for an understanding of the details of its construction reference is to be made.

Inasmuch as my present invention, as already explained, relates to the special novel means for supporting, retaining in supported position, and permitting the drop of said fender and its adjuncts and the means for manually controlling the several movements and positions,—I will confine myself to a description of these improvements.

Referring first to Figures 3 to 6 inclusive,— 6 designates the crank shaft, mounted in bearings 7 on the longitudinally-extending frame bars 8, of the fender, which also support certain other adjuncts.

9 designates a crank arm on the crank shaft 6, upon a side arm of which is formed a notch 10 which engages the inner end 13 of a crank-dog 11 which is adapted to rock on a crank-dog-shaft 12 fixed transversely in the frame bars 8.

In Figure 5 it will be noticed that the crank being in a vertical position and its notch 10 down, the inner end 13 of the crank dog 11 will be engaged against said notch so that the dog will be retained in the horizontal position shown, the stop 74 limiting the forward movement of the crank 9.

In this position the downwardly curved outer end 14 of the dog 11 overhangs and is in engagement with the inner or cam end 15 of a tripping sliding bar 16, which extends outwardly beyond the crank,—slidable in suitably formed bearings in the frame bars,—in the form of an outer arm 17 connected with an arm-bar spring 18 which tends to maintain the sliding bar in the outward position shown in Figure 5.

19 designates a safety lever pivoted at 20 to the tripping sliding bar 16, the said lever being normally in contact with the inner end of the tripper rod 21 controlled by a spring 22.

23 designates a rod upon which is mounted the safety lever 24 which, under the control of the safety lever chain 32 hereinafter referred to, is adapted to deflect the safety lever 19 on its pivot and permit an inward movement of the tripper rod 21 under the stress of the spring 22. The inward movement of the sliding bar 16 lowers the forward end of the crank dog 11 causing it to disengage the dog 11 from the crank, then moves the crank off center, and the fender drops.

In Figure 7, I have shown an anti-rattling device on the tripper rod comprising a conical collar 50 adapted in the forward movement of the rod to encounter and seat itself in a conical cushion 51 on a frame cross bar.

Mounted on the crank shaft 6 is a wheel 25 protected by a wheel housing 26 of any preferred character.

The other features illustrated in Figures 3 and 4 which have relation to the cushioning springs of the bumper and fender are illustrated in a more or less detail in Figure 8 and being features included in my pending application require no further description herein than is given a little later.

The positions of the several latching and tripping devices already described, both when the fender is in its lifted or normal position as shown in Figure 5, and when it is in its released or dropped position, as shown in Figure 6, with the bumper bar or trip member held in its extreme inward position, are so well illustrated in said figures as to require no further description, for the reason that one skilled in the art, with only the figures before him, will easily understand the shapes and movements of the parts.

The manual control of these latching and tripping devices, is as already mentioned, one of the features of novelty of my present invention, and one which is substituted for the pedal control of my pending application above referred to.

Referring now more particularly to Figures 3, 8, 9, 10, 11 and 12, I have mounted upon the steering column 28 by means of adjustable, attached, carrying collars 29, a group of what I call cylindric handle holders 34, in the construction shown three in number, and adapted through other controlling devices to exert traction or release upon a corresponding number of chains or equivalent control connections which I have respectively designated as a lifting chain 30, a releasing chain 31, and a safety lever chain 32.

Referring first to the releasing chain 31, see particularly Figures 5, 8, 11 and 12, this chain extends from the central handle holder typically shown in Figure 12, to a connection 35 with the tripping sliding bar 16, so that when traction is exerted upon it said bar 16 is pulled against resistance of spring 18, a distance sufficient to cause the cam end 15 of said bar 16 to travel inwardly against the inner end 14 of the crank dog 11, and so tilt it upon its shaft 12 as an axis, as to cause the downward movement of its outer end 13 until said outer end escapes the notch 10 on the crank 9.

The bar 16 contacts with the crank and moves it off center and the fender drops due to gravity and its own weight into the position seen in dotted lines in Figure 3.

The wrist pins 36 have connected to them the lower ends of the plunger rods 38, the plungers 57 of which are resilently supported by the springs 58, see Figure 4, and upper springs 59 are provided. The top and bottom of the casing 37 are connected by tension rods 60.

It will thus be seen that the fender is resiliently supported intermediate its front and rear ends. The pull of the releasing chain 31 is effected by means of the handle holder seen in Figure 12 in which 33 represents a bearing for the handle holder 34 which is keyed to such bearing by means of the key 51. The internal construction of the handle holder seen in Figure 12 is the same as that of the handle holder seen in Figure 11 from which it will be understood that a cylindric slidable sleeve 43 is provided slidable in the bearing 33 into which passes a pull rod 40 having an eye to which is connected the releasing chain 31, see Figure 12. The pull rod 40 at its outer end is provided with a piston 62. A spring 45 is interposed between the forward end of the sleeve 43 and the piston 62 so that the tendency of such spring is to move the piston 62 outwardly and to hold collar 44 against the bearing 33. This collar 44 is fixed to the stem of the grasping handle 41 and also to the sleeve 43 so that the handle 41 and sleeve 43 must move in unison.

The handle holder which is connected to the safety lever chain 32 is of the same construction as that described but has in addition a stop member in the form of a sleeve 42 on the sleeve 43, see more particularly Figures 9, 10 and 11. In addition, I provide means for locking the sleeve 43 in its outward position and instead of employing a key 61, as shown in Figure 12, I employ a key 47 which when the handle 41 is drawn outwardly and partially rotated will engage the shoulder 48. The upper handle holder seen in Figure 8 is of a different construction as shown in Figure 15, it being seen that the lifting chain 30 is connected with a rod 63 which passes through a friction clutch box 64.

65 designates a spring one end of which is fixed to the friction box and the free end of which carries a locking portion 66 which is adapted to engage one of the recesses 67 in the rod 63. 68 designates a bar carrying the set screw 69 adapted to contact with the spring 65 to vary its tension and a lock nut 70 is provided for the set screw 69. The rod 63 is provided at its outer end with a piston 71 which is slidable in the sleeve 43 of greater length than the other sleeves 43 and the handle 41 is connected with this sleeve 43 in the manner already described in connection with Figures 9 to 12 inclusive. The rod 63 is guided in the plunger 72 fixed to the inner end of the sleeve 43. This also serves as a stop for the piston 71.

In Figure 7, I have shown an antirattling device for the tripper rod 21 consisting of a collar 50 secured to the tripper rod 21 and having a conical portion to engage with the seat 51.

In Figure 13, I have illustrated provision for preventing rattling of the fender frame proper at all times. The fender supporting rods 52 are hinged to the front axle 4, see Figure 4, and extend into the longitudinally extending bars 8. These rods 52 are square in cross section and near their forward or free ends have pinned thereto the upper and lower wedges 53 which are adapted to engage the seat 54 which is carried by the frame members 8. As will be understood from Figure 13, each rod 52 has two sets of wedges and seats to co-operate with them and a spring 55 is interposed between one seat and the wedge which co-operates with the other seat. This device serves as a shock absorber when the fender strikes an object and also as an antirattling device.

The operation will now be readily apparent to those skilled in this art and is as follows:—

When the fender is in its normal or horizontal position, the parts appear as seen in Figures 3, 4 and 5, the crank dog 11 being in engagement with the notch 10 on the crank arm 9 of the crank shaft 6.

The bumper bar 27, see Figures 1 and 4, has connected to it the trip rods 21 and only one of these trip rods 21 is utilized to effect the unlatching of the locking mechanism for retaining the fender in its raised position. In other words, only one locking device is employed.

I will next describe the manner in which the fender automatically drops in case the bumper 27 comes into contact with an object. Such contact will cause the bumper bar 27 to move inwardly thereby moving inwardly the trip rods 21 one of which engages the safety lever 19, see Figure 5, thereby advancing the tripping sliding bar 16 and causes its cam end 15 to raise or rock the crank dog 11 and move its end 13 out of the notch 10 and thus unlock the crank shaft. The continued forward movement of the trip bar 21 moves the tripping sliding bar 16 into contact with the crank arm 9 thus moving the crank shaft off center and the fender drops due to gravity and its own weight and the forward portion of the fender drops into such position that the shoes 73 ride on or near the ground.

Assuming now that the fender is automatically dropped and the operator desires to return it to its normal horizontal or set position, he draws on the grasping handle 41 which is connected to the rod 63, see Figure 15, and as this rod is connected with the chain 30 which in turn is connected with the the wheel 25 which is fixed on the crank shaft 6, the crank shaft will be rotated from the position seen in dotted lines in Figure 3 to that seen in full lines in Figure 3 and the crank dog 11 engages the notch 10, as shown in Figure 5, so that the fender is locked in its set position. The movement of the crank arm 9 is limited in one direction by the stop 74.

The parts are shown in their normal position in Figure 15 and when the fender drops the piston 71 moves forwardly into proximity to the collar 72 and stays in such position while the fender is down. When the operator draws the handle 41 towards him to raise the fender the piston 71 contacts with the collar 72. As soon as the fender is raised, the operator pushes inwardly the handle 41 and its adjuncts so that such parts are out of the way and are in the position seen in Figure 15. The purpose of the recesses 67 is to keep the chain 30 taut, it being seen that when the rod 63 is drawn upwardly, the locking member 66 will engage a recess 67 registering therewith and retain such rod 63 in the position to which it has been drawn upwardly. The rod 63 will thus stay in this position until the fender again drops.

If the operator desires to manually cause the fender to drop he actuates the grasping handle 41 seen in Figure 12 drawing such handle toward him and thereby exerting a pull on the chain 31 which is connected with the tripping and sliding bar 16, see Figures 5 and 6. This causes the release of the latching mechanism as before explained and the fender drops in a similar manner to that already described in connection with the automatic operation. I also provide means to render the bumper bar inactive to cause the fender to automatically drop in case the bumper bar strikes an object. For example, when it is desired to park the car, it is desirable to provide means to cause the fender to be retained in its raised position in case the bumper bar should contact with another automobile or other object. For this purpose the grasping handle 41 is drawn towards the operator as seen in Figures 9 and 10, the rod 40 of which is connected to the chain 32. The chain 32 is connected with the lever 24 so that when this lever is rocked, it raises the safety lever 19 out of the path of the trip member 21, as shown in dotted lines in Figure 5.

Figure 2:
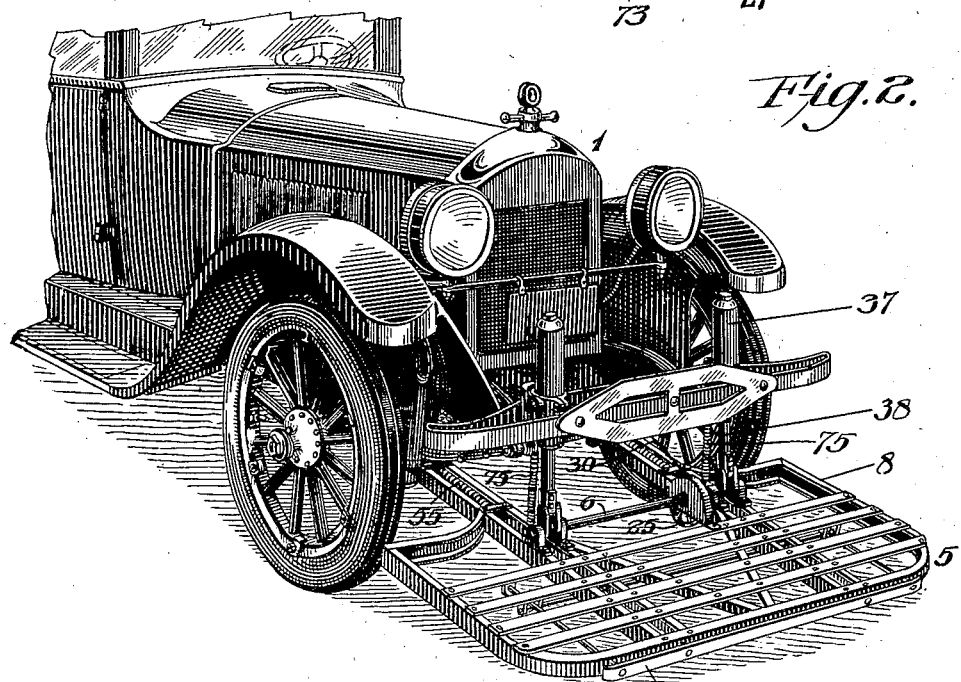
Figure 2 represents a similar view with the fender in its released and dropped position.

If the handle 41 is partially revolved so as to bring the key 47 into the position seen in Figure 10, at which time it engages the shoulder 48, it will be apparent that the safety lever 19 is retained in its inoperative position, as seen in dotted lines, Figure 5. If this safety lever 19 is in its inoperative position, it will be apparent that the fender can be unlatched so that it will drop in case the operator exerts a pull on the chain 31, or it can be raised by the operator. In order to assist in the raising of the fender and to partially balance it, I preferably provide the springs 75, see Figures 1, 2 and 3.

Having thus described my invention, what I claim as new and desire to secure by Letters Patent, is:—

1. A device of the character stated, comprising a fender hingedly supported at one end, a bumper carried by said fender and resiliently supported between its front and rear, and latching and tripping means manually controlled by the driver for both lifting and dropping said fender.

2. A device of the character stated, comprising a fender hingedly supported at one end, a bumper carried by said fender and resiliently supported between its front and rear, latching and tripping means manually controlled by the driver for both lifting and dropping said fender, and means operating through the bumper to effect the automatic release and drop of said fender.

3. The combination with a motor vehicle, of a fender hingedly supported at one end, a bumper carried by said fender and having a forward and backward movement with respect thereto and resiliently supported between its front and rear, and latching and tripping means manually controlled by the driver for controlling the fender either to raise or to release and lower it.

4. The combination with a motor vehicle, of a fender hingedly supported at one end, a bumper carried by said fender and resiliently supported between its front and rear, latching and tripping means manually controlled by the driver for controlling the fender either to raise or to release and lower it, and automatic means connected with the bumper for effecting the release and lowering of the fender.

5. The combination with a motor vehicle, of a fender hingedly supported at the front end of said vehicle so as to be adapted to be raised and lowered about its hinge, a group of handle holders embodying handles carried by the steering column and operable by the driver of the vehicle, and latching and tripping means intermediate of said handle holders and handles and said fender for enabling the driver through the movement of the handles upon said latching and tripping means to raise or to lower the fender.

6. The combination with a motor vehicle, of a fender hingedly supported at the front end of said vehicle so as to be adapted to be raised and lowered about its hinge,—a bumper carried by said fender,—a group of handle holders embodying handles carried by the steering column and operable by the driver of the vehicle,—and latching and tripping means intermediate of said handle holders and handles and said fender for enabling the driver through the movement of the handles upon said latching and tripping means to raise or to lower the fender, and operable also by the bumper automatically to release and lower the fender.

7. In a motor vehicle, the following elements in combination:—a fender hingedly supported at the front end of said vehicle,—a group of handles operable by the driver of the vehicle,—latching and tripping means intermediate of said handles and said fender for enabling the driver to raise and lower the fender, and comprising a crank formed with a notch, a tripping sliding bar movable longitudinally, a tiltable crank dog operative with relation to said sliding bar, one end of which dog is formed and placed so as to be adapted to engage the notch of the crank,—and means connected with one of the handles for effecting the longitudinal movement of the sliding bar to effect the tilting of the crank dog relatively to said sliding bar and said crank, whereby the fender may be raised and latched or unlatched and lowered.

8. In a motor vehicle, the following elements in combination:—a fender hingedly supported at the front end of said vehicle,—a bumper carried by said fender,—a group of handles operable by the driver of the vehicle,—latching and tripping means intermediate of said handles and said fender and bumper, operable manually by the driver to raise and lower the fender, and operable automatically by the bumper to lower the fender, comprising a crank formed with a notch, a longitudinally movable sliding bar, a tilting crank dog operable with relation to said sliding bar, one end of which dog is formed and placed so as to be adapted to engage the notch of the crank,—and means connected both with the handles and with the bumper for effecting the longitudinal movement of the sliding bar to effect the tilting of the crank and the release of the crank dog relatively to the sliding bar, whereby the fender may be manually raised or lowered and automatically lowered.

9. In a device of the character stated, a fender pivotally supported at one end, a crank shaft carried by said fender and resiliently supported, locking mechanism for said crank shaft, including a releasing member adapted to be automatically actuated when the fender contacts with an object.

10. In a device of the character stated, a fender pivotally supported at one end, a crank shaft carried by said fender and resiliently supported, locking mechanism for said crank shaft including a releasing member adapted to be automatically actuated when the fender contacts with an object, and means under the control of the operator to actuate said releasing member.

11. In a device of the character stated, a fender pivotally supported at one end and resiliently supported intermediate its ends such support including a crank shaft, a dog to interlock with said crank shaft and retain it in its set position, means carried by said fender to automatically actuate said dog to release said crank shaft and to move said crank shaft into a position to cause the fender to drop.

12. In a device of the character stated, a fender pivotally supported at one end and resiliently supported intermediate its ends, said support including a crank shaft, a bumper bar carried by said fender, a dog to lock with said crank shaft, a releasing member for said dog, means to cause said bumper bar to actuate said releasing member, and means under the control of the operator to move said means out of the path of action of said bumper bar.

13. In a device of the character described, a fender pivotally supported at one end, a bumper bar effective to cause said fender to automatically drop, means to prevent the dropping of said fender when said bumper bar is actuated, and manually controlled means to cause the fender to drop irrespective of whether the bumper bar is operative or inoperative to effect the automatic drop of said fender.

14. In a device of the character described, a fender pivotally supported at one end and resiliently supported intermediate its ends, a bumper carried by said fender and provided with means to prevent its rattling when in normal position, and means to effect the raising and lowering of said fender.

15. In a device of the character described, a fender having frame members, shafts having relative movement with respect to said frame members and adapted to be pivotally supported to carry the fender, wedges carried by said shafts, seats carried by said frame members to be engaged by said wedges, and a tension device co-operating with said shafts and frame member.

16. In a device of the character described, a fender adapted to be pivotally supported at one end and resiliently supported intermediate its ends, said resilient support including a crank shaft, a wheel on said crank shaft, and means connected with said wheel to effect the rotation of said crank shaft and thereby the raising of said fender.

17. In a device of the character described, a fender pivotally supported at one end and resiliently supported intermediate its ends, said resilient support including a crank shaft, a dog co-operating with said crank shaft to lock it in its set position, a releasing member for said dog and also adapted to move said crank shaft off center to permit it to drop when released, a second member connected with said releasing member, a bumper bar having a trip co-operating with said second member to actuate said releasing member, means under the control of the operator to actuate said releasing member, and means under the control of the operator to prevent said trip co-operating with said second member.

18. In a device of the character described, a fender and controlling means therefor comprising a connection to said fender, a rod secured to said connection and having a piston, a sleeve in which said piston is slidable, a spring disposed within said sleeve and acting against said piston, and a handle connected with said sleeve to actuate it.

19. In a device of the character described, a fender and controlling means therefor comprising a connection to said fender, a rod secured to said connection and having a piston, a sleeve in which said piston is slidable, a spring disposed within said sleeve and acting against said piston, a handle connected with said sleeve to actuate it, and means to limit the travel of said sleeve.

20. In a device of the character described, a fender and controlling means therefor comprising a connection to said fender, a rod secured to said connection and having a piston, a sleeve in which said piston is slidable, a spring disposed within said sleeve and acting against said piston, a handle connected with said sleeve to actuate it, and means to lock said sleeve in the position to which it has been adjusted.

21. In a device of the character described, a fender and controlling means therefor, comprising a connection to said fender, a rod secured to said connection and provided with a piston and having recesses, a sleeve in which said piston is slidable, a closure for said sleeve, a grasping handle for said sleeve, and a spring actuated locking member to engage one of said recesses to retain said rod in the position to which it has been moved.

22. In a device of the character described, a fender pivotally supported at one end, a bumper bar effective to cause said fender to automatically drop, means to prevent the dropping of said fender when said bumper bar is actuated, manually controlled means to cause the fender to drop irrespective of whether the bumper bar is operative or inoperative to effect the automatic drop of said fender, and manually controlled means to raise said fender irrespective of whether the bumper bar is operative or inoperative to effect the automatic drop of said fender.

ALFRED C. McCLOSKEY.

Witnesses:
H. S. FAIRBANKS,
F. A. NEWTON.